(12) United States Patent
Balasubramanian et al.

(10) Patent No.: US 9,619,812 B2
(45) Date of Patent: Apr. 11, 2017

(54) SYSTEMS AND METHODS FOR ENGAGING AN AUDIENCE IN A CONVERSATIONAL ADVERTISEMENT

(75) Inventors: Sundar Balasubramanian, Seattle, WA (US); Michael McSherry, Seattle, WA (US); Aaron Sheedy, Seattle, WA (US)

(73) Assignee: Nuance Communications, Inc., Burlington, MA (US)

(*) Notice: Subject to any disclaimer, the term of this patent is extended or adjusted under 35 U.S.C. 154(b) by 510 days.

(21) Appl. No.: 13/597,017

(22) Filed: Aug. 28, 2012

(65) Prior Publication Data

US 2014/0067395 A1   Mar. 6, 2014

(51) Int. Cl.
*G10L 15/04* (2013.01)
*G06Q 30/02* (2012.01)
*G06F 17/30* (2006.01)

(52) U.S. Cl.
CPC ....... *G06Q 30/02* (2013.01); *G06F 17/30654* (2013.01); *G06Q 30/0241* (2013.01)

(58) Field of Classification Search
CPC ............................................. G06F 17/30654
USPC ...................................................... 704/251
See application file for complete search history.

(56) References Cited

U.S. PATENT DOCUMENTS

| | | | |
|---|---|---|---|
| 6,282,703 B1 | 8/2001 | Meth et al. | |
| 6,282,713 B1 | 8/2001 | Kitsukawa et al. | |
| 6,751,800 B1 | 6/2004 | Fukuda et al. | |
| 7,349,527 B2* | 3/2008 | Yacoub et al. | 379/88.11 |
| 7,991,349 B2 | 8/2011 | Kang et al. | |
| 8,099,325 B2 | 1/2012 | Gangadharpalli et al. | |
| 8,156,004 B2 | 4/2012 | Wajihuddin | |
| 8,195,508 B1* | 6/2012 | Calder | G06Q 30/0207 705/14.1 |
| 8,204,786 B2 | 6/2012 | LeBoeuf et al. | |
| 8,209,171 B2 | 6/2012 | Abbott et al. | |
| 8,239,491 B1* | 8/2012 | Tsun | G06F 17/30902 705/14.67 |
| 8,364,528 B2* | 1/2013 | Selinger | G06Q 30/02 705/14.24 |

(Continued)

FOREIGN PATENT DOCUMENTS

| | | |
|---|---|---|
| EP | 2386993 A1 | 11/2011 |
| JP | 2004078876 | 3/2004 |

(Continued)

OTHER PUBLICATIONS

U.S. Appl. No. 13/749,798, filed Jan. 25, 2013, Balasubramanian et al.

(Continued)

*Primary Examiner* — Jakieda Jackson
(74) *Attorney, Agent, or Firm* — Perkins Coie LLP

(57) ABSTRACT

A system and method are described for engaging an audience in a conversational advertisement. A conversational advertising system converses with an audience using spoken words. The conversational advertising system uses a speech recognition application to convert an audience's spoken input into text and a text-to-speech application to transform text of a response to speech that is to be played to the audience. The conversational adverting system follows an advertisement script to guide the audience in a conversation.

22 Claims, 7 Drawing Sheets

(56) References Cited

U.S. PATENT DOCUMENTS

| | | | |
|---|---|---|---|
| 8,458,168 B2 | 6/2013 | Surendran et al. | |
| 8,966,520 B2 | 2/2015 | Tom et al. | |
| 9,113,213 B2 | 8/2015 | Balasubramanian et al. | |
| 2002/0052778 A1* | 5/2002 | Murphy | G06Q 30/02 705/14.36 |
| 2002/0095295 A1* | 7/2002 | Cohen | H04M 3/493 704/275 |
| 2005/0060742 A1 | 3/2005 | Riedl et al. | |
| 2005/0108011 A1 | 5/2005 | Keough et al. | |
| 2005/0278741 A1 | 12/2005 | Robarts et al. | |
| 2006/0047704 A1 | 3/2006 | Gopalakrishnan | |
| 2006/0167747 A1* | 7/2006 | Goodman et al. | 705/14 |
| 2007/0185816 A1 | 8/2007 | Davis | |
| 2008/0021710 A1* | 1/2008 | Ho | 704/270.1 |
| 2008/0215436 A1* | 9/2008 | Roberts | G06Q 30/0207 705/14.1 |
| 2008/0313030 A1* | 12/2008 | Makeev | G06Q 30/02 705/14.71 |
| 2009/0124272 A1* | 5/2009 | White et al. | 455/466 |
| 2009/0132267 A1* | 5/2009 | Ganz | G06Q 10/04 705/346 |
| 2009/0144168 A1* | 6/2009 | Grouf | G06F 17/3005 705/26.1 |
| 2009/0245479 A1 | 10/2009 | Surendran | |
| 2009/0254632 A1 | 10/2009 | Kannan et al. | |
| 2009/0265552 A1* | 10/2009 | Moshir | H04L 63/0464 713/168 |
| 2010/0051560 A1 | 3/2010 | Littman et al. | |
| 2010/0145803 A1* | 6/2010 | Kobani | G06Q 30/02 705/14.52 |
| 2010/0169173 A1* | 7/2010 | Vogels | G06Q 30/02 705/14.41 |
| 2010/0211621 A1* | 8/2010 | Hariharan | G06Q 30/0277 707/829 |
| 2010/0268597 A1* | 10/2010 | Bookstaff | G06F 17/30864 705/14.49 |
| 2010/0318357 A1 | 12/2010 | Istvan et al. | |
| 2011/0125777 A1 | 5/2011 | Begeja et al. | |
| 2011/0166932 A1* | 7/2011 | Smith et al. | 705/14.53 |
| 2011/0196733 A1* | 8/2011 | Li | G06Q 30/0243 705/14.42 |
| 2011/0225291 A1* | 9/2011 | Dobroth | G06Q 30/02 709/224 |
| 2011/0231261 A1* | 9/2011 | Sattaru et al. | 705/14.66 |
| 2011/0265117 A1 | 10/2011 | Cha et al. | |
| 2011/0313834 A1* | 12/2011 | Jain | G06Q 30/0214 705/14.16 |
| 2011/0321003 A1* | 12/2011 | Doig | G06F 8/34 717/107 |
| 2012/0022950 A1* | 1/2012 | Gilbert et al. | 705/14.66 |
| 2012/0089455 A1* | 4/2012 | Belani | G06Q 30/0245 705/14.44 |
| 2012/0109759 A1* | 5/2012 | Oren et al. | 705/14.72 |
| 2013/0046544 A1 | 2/2013 | Kay et al. | |
| 2013/0110666 A1* | 5/2013 | Aubrey | G06Q 30/0641 705/26.5 |
| 2013/0158980 A1 | 6/2013 | Landry et al. | |
| 2014/0019377 A1* | 1/2014 | Bhaumik | G06Q 30/0641 705/339 |

FOREIGN PATENT DOCUMENTS

| | | |
|---|---|---|
| JP | 2004312093 | 11/2004 |
| KR | 1020000072128 | 12/2000 |
| KR | 1020090085995 | 8/2009 |
| KR | 20100050208 | 5/2010 |

OTHER PUBLICATIONS

International Search Report and Written Opinion for International Application PCT/US2014/012613; Applicant Nuance Communications, Inc.; Mail Date May 9, 2014; pp. 12.

International Search Report and Written Opinion for International Application PCT/US2013/057166; Applicant Nuance Communications, Inc.; Mail Date Dec. 12, 2013; 13 pages.

Supplementary European Search Report, European Application No. 13833326.5, mailed Jul. 29, 2015, 8 pages.

* cited by examiner

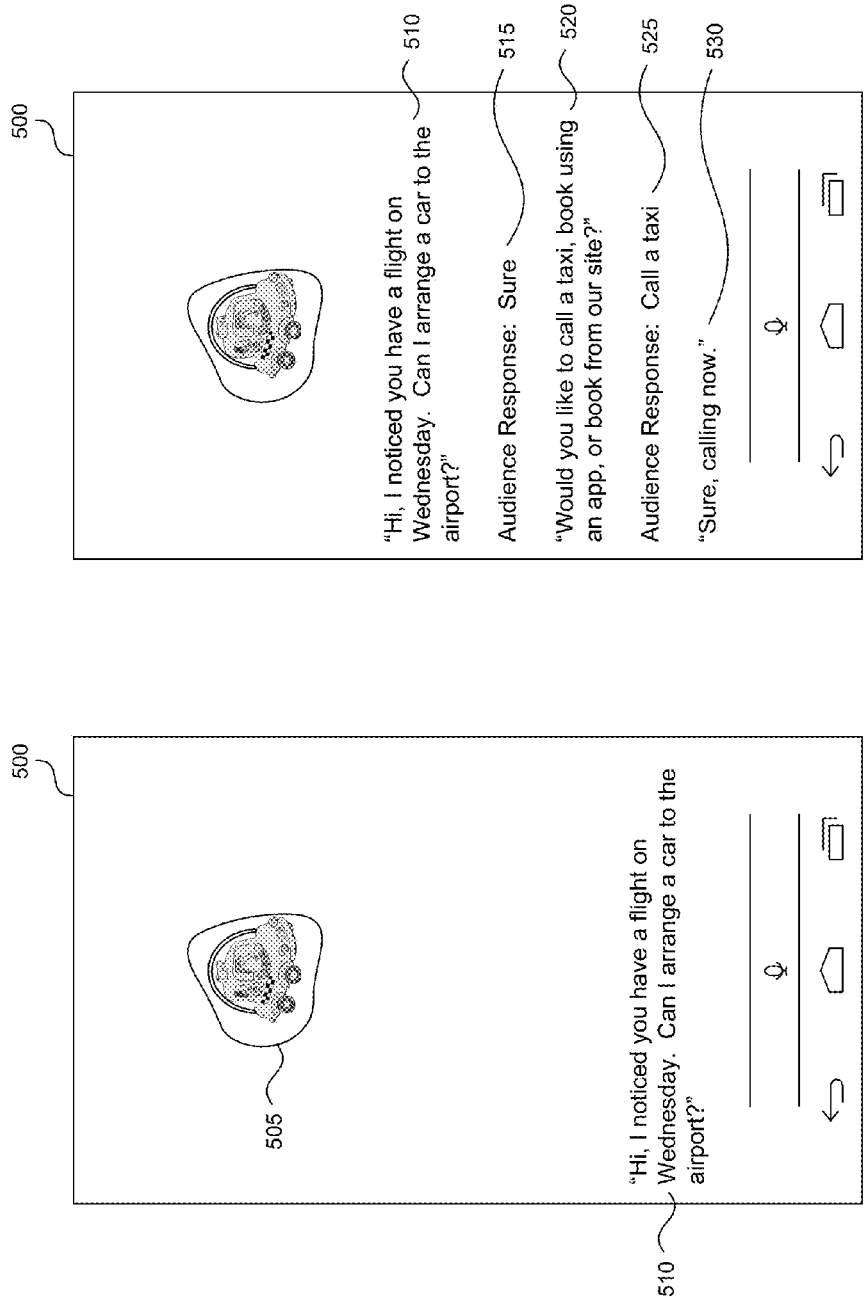

SYSTEMS AND METHODS FOR ENGAGING AN AUDIENCE IN A CONVERSATIONAL ADVERTISEMENT

BACKGROUND

Advertising is used to persuade an audience to take or continue to take a particular action. The success of an advertisement or an advertising campaign depends on a number of factors. One prominent factor is whether an advertiser is able to reach a target audience with its message. For example, an advertisement for diapers will have little success in persuading consumers who do not have a baby to buy diapers. Another factor is whether an advertiser is able to grab and hold the target audience's attention. An advertisement that an audience quickly dismisses or does not notice will likely have little effect on the audience's behavior.

Traditional media is limited as a mode for advertisers to either target a proper audience or hold the audience's attention. Using traditional media, such as television or print, an advertiser may direct its message to particular demographics of a population, which may be identified based on who is most likely to be consuming the media that the advertisements are tied to. But many members of the audience who ultimately consume the media may not fit the targeted demographic or may otherwise find the advertisement irrelevant. And the passive nature by which traditional media is consumed makes it difficult to engage audiences with advertisements.

The Internet has transformed advertising. It enables advertisers to target audiences on an individual basis using methods that are technologically infeasible through traditional media. For example, information can be learned about a user from his or her browsing or purchasing history, search queries, social networking profile, email messages, and so on. And, if advertisers are able to recognize the user, they can identify and present ads that are likely to be relevant. The Internet also allows advertisers to engage users in ways that are impossible through traditional media. For example, computer users may select a banner advertisement to commence purchasing a product or choose a commercial that they would like to view during a sitcom.

However, like with traditional media, online advertisers have a difficult time fully engaging an audience. Online advertisements litter web page sidebars and footers of mobile apps, unnoticed by users or too inconvenient for them to engage with. And those that are able to attract a user's attention, such as pop-up ads and surveys, are obtrusive and degrade a user's experience of a webpage. Furthermore, as the Internet has evolved and consumers have increasingly consumed traditional media through the Internet, Internet usage has become more passive. As a result, it is more difficult for advertisers to exploit the interactive capabilities of the Internet when advertising to an online audience.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 5A and 5B are a representative user interface that may be generated by a mobile device to display a conversational advertisement to an audience.

DETAILED DESCRIPTION

Figure 1:
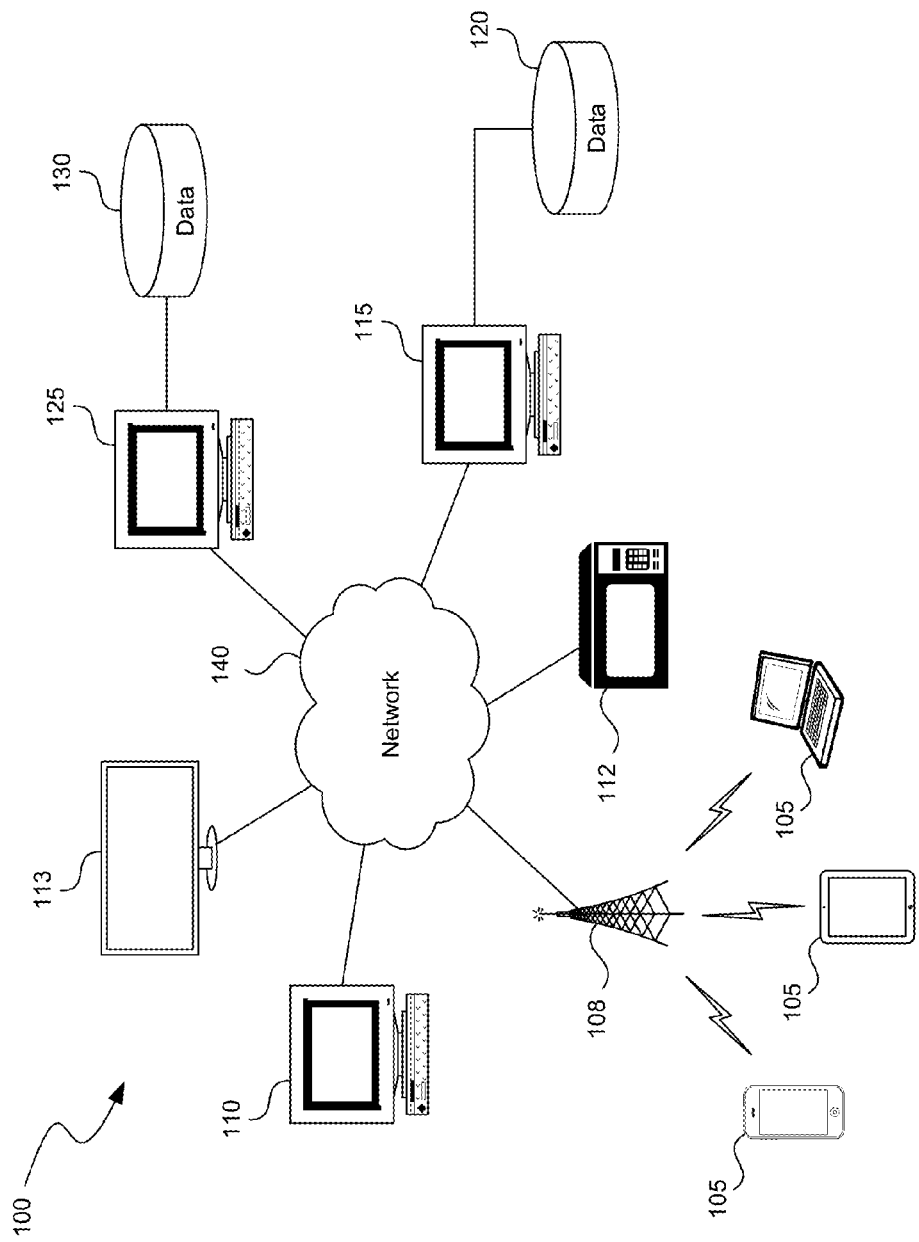
FIG. 1 is a diagram of a suitable environment in which a conversational advertising system operates.

A conversational advertising system will now be described below, which operates advertisements that engage an audience in a conversation. The conversational advertising system delivers advertisements via personal computers, mobile devices, tablet computers, televisions, appliances, and the like. Through these conversational advertisements, the conversational advertising system participates in a verbal conversation with an audience. For example, an advertisement during a television show may pose a question to the audience using spoken words, and each member of the audience may in turn respond to the question using spoken words. The conversational advertising system recognizes the audience's response and may reply, thus conversing with members of the audience or the audience as a whole. The conversational advertising system may also listen to a conversation among members of an audience in order to advertise to the audience. For example, the conversational advertising system may be implemented in a gaming environment in which an audience is split into teams to play a trivia game. The conversational advertising system may listen to audience members converse among each other in order to ask relevant trivia questions or interject comments or questions associated with an advertisement. By engaging an audience in a conversation, an advertiser is able to hold the audience's attention for an extended period of time. The advertiser can also mold the conversation based on the audience's response or information identified by analyzing a response (e.g., a gender or age of the audience), enabling the advertiser to identify the true desires and interests of the audience. An advertiser can also create a conversational advertisement at a cost that is much lower than if the advertiser were to produce a rich video or other advertisement. As a result, an advertiser is able to more effectively persuade an audience with its message, as well as provide other benefits.

A conversational advertisement can be presented by web pages, television shows, radio programs, an Intelligent Agent user interface, mobile applications (including third party apps), and the like. Accordingly, the conversational advertising system may present conversational advertisements in many ways. For example, conversational advertisements may be included as part of commercial breaks during television or radio programs, in banner advertisements on web pages, and presented by mobile apps. Conversational advertisements may include audio only, video and audio, audio and computer-generated graphics, and other combinations of media that include audio. Conversational advertisements interact with an audience using natural language dialog. A conversational advertisement may include multiple possible responses to convey to an audience. Accordingly, a single conversational advertisement may contain hundreds of different messages, or more, that an advertiser can convey to an audience depending on responses received from the audience and other factors.

The conversational advertising system may commence a conversational advertisement by positing a question to an audience or by otherwise providing an indication to the audience that the audience may respond verbally to an advertisement. For example, the conversational advertising system may synthesize speech that is played to the audience or identify and play pre-recorded audio segments, instructing the audience to respond by stating the audience's preference with regard to a matter. The conversational advertising system may also generate a graphic or play a video that indicates to the audience that it can speak to the advertisement to provide input. The conversational advertising system may modify the graphic or play particular videos based on an audience's input and/or the progress of the conversation.

Figure 4A:
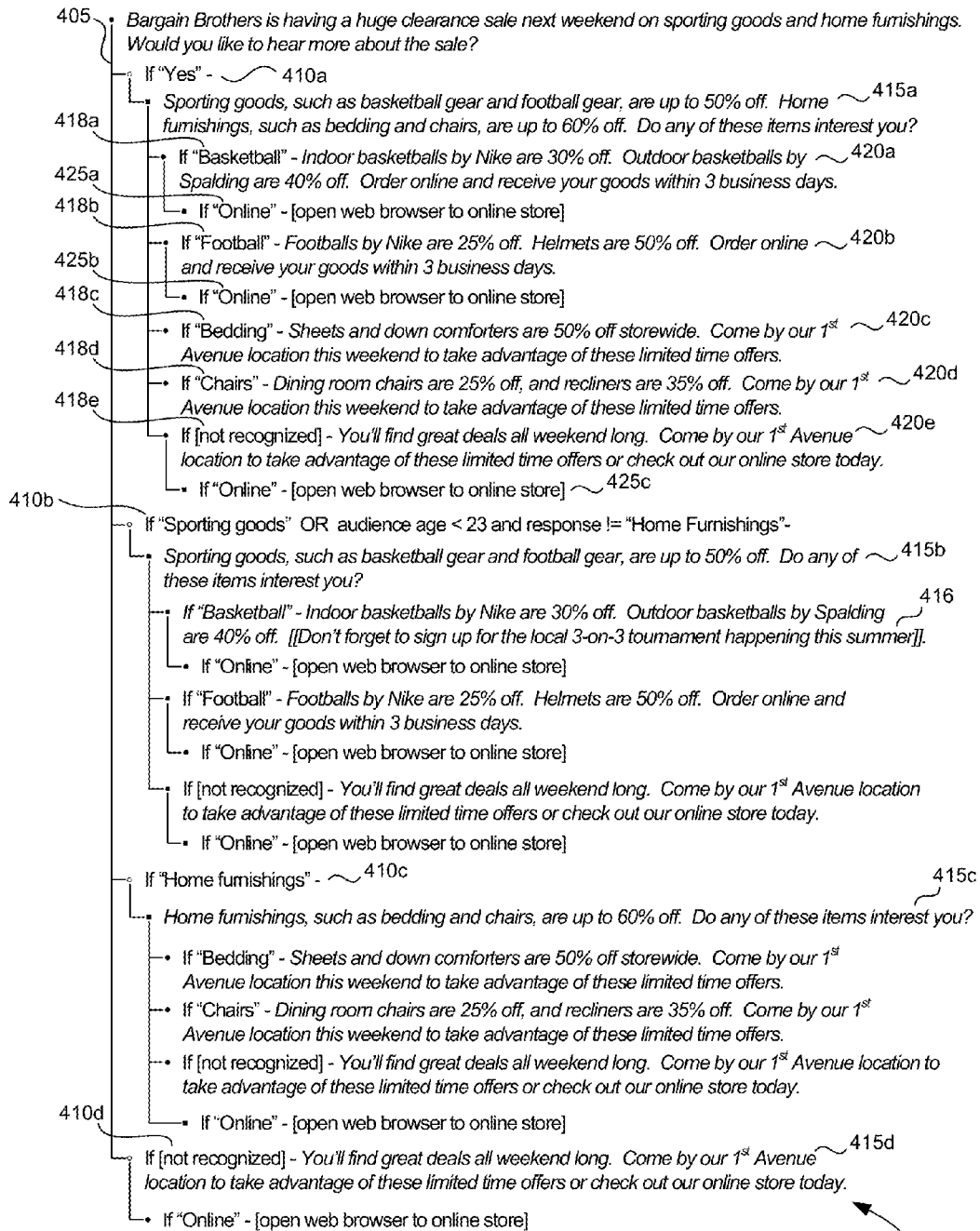
FIG. 4A is an example advertisement script that a conversational advertising system may follow to engage an audience in a conversational advertisement.
Figure 4B:
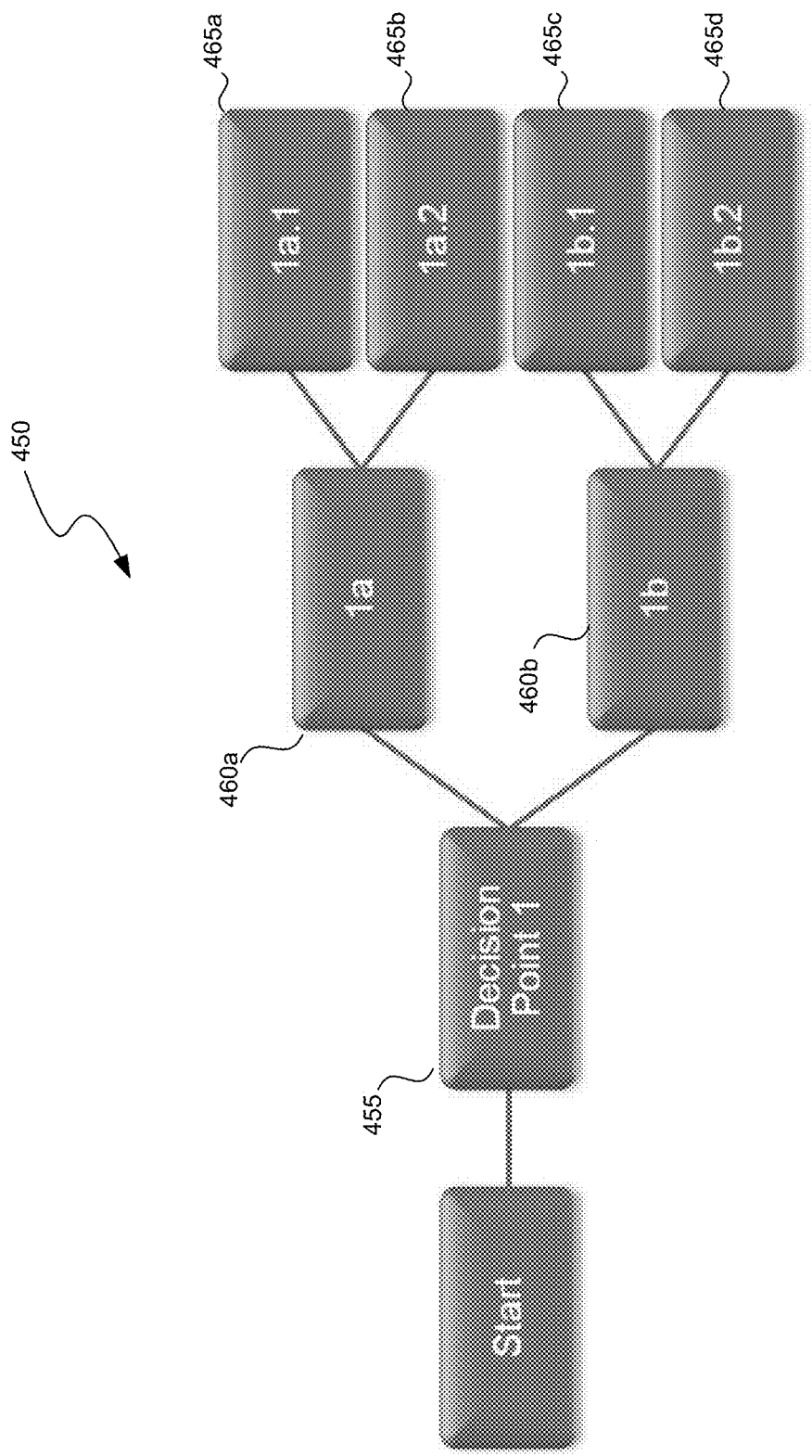
FIG. 4B is a block diagram of an advertisement script tree that is based on an example advertisement script.

Each conversational advertisement is associated with an advertisement script that guides a conversation. In some implementations, an advertisement script includes questions or statements for the conversational advertising system to convey to an audience, answers that are to be recognized by the conversational advertising system if they are spoken by the audience in a response, and further questions or statements that are to be conveyed to the audience if appropriate and/or actions that are to be taken based on the audience's response(s). An advertisement script may include many levels of questions, answers, and actions and many different possible audience responses to convey to an audience or to expect to receive from the audience. As an example, FIG. 4B is a block diagram of an advertisement script tree 450 that is based on an example advertisement script that the conversational advertising system may follow in engaging an audience in a conversational advertisement. After presenting the conversational advertisement to an audience, an audience's input is received. Based on input from the audience and/or other factors as described herein, at a first decision point 455, the conversational advertising system proceeds to a first branch level 460 of the tree, to either a first first level branch 460a or a second first level branch 460b. The advertisement script includes different questions and/or actions that are to be conveyed to the audience and/or taken depending on whether the conversational advertising system proceeds to the first first level branch 460a or the second first level branch 460b. After receiving input from the audience at the first branch level 460 of the tree, and/or based on other factors, the conversational advertising system proceeds to a second branch level 465 of the tree. The advertisement script includes different questions and/or actions that are to be conveyed to the audience and/or taken depending on whether the conversational advertising system proceeds to a first second level branch 465a, a second second level branch 465b, a third second level branch 465c, or a fourth second level branch 465d.

The conversational advertising system may navigate through an advertisement script based at least in part on environmental conditions surrounding the presentation of the conversational advertisement. In some implementations, an advertisement script includes a "non-connected path," which is followed if the conversational advertising system determines that conditions surrounding the presentation of the advertisement prevent the conversational advertising system from adequately receiving an audience's input. Such conditions include if a device for presenting the conversational advertisement does not include or does not have access to a suitable microphone, if a microphone is available but unable to record audio with sufficient quality for the conversational advertising system to determine that the audience has provided verbal input, or if a backend speech recognition system is non-responsive. The non-connected path specifies a particular path through the advertisement script that the conversational advertising system is to follow to navigate a conversational advertisement with no audience participation. In some implementations, an advertisement script includes a "nonsense path," which is followed if the conversational advertising system determines that an audience's input can be captured but not deciphered, or the audience's input is irrelevant or nonsense. The nonsense path specifies a particular path that the conversational advertising system is to follow through the advertisement script in a manner that acknowledges to the audience that audience input was received but was determined to be unusable. In some implementations, an advertisement script includes a default path, which the conversational advertising system follows if an audience's input can be received (e.g., a microphone is able to record the audience's input), but the audience provides no input.

The conversational advertisement system may modify an advertisement script, including questions, statements, or actions included therein, during a conversation with an audience. For example, the conversation advertising system may add, to a question, a name of an audience member or a city that the audience lives in. (The term "audience" is generally used herein to represent a group of individuals, a single individual from the group, or even client devices within a group of devices.) In some implementations, the conversational advertising system changes a direction of a conversation partway through the conversation based, at least in part, on responses received from the audience. For example, the conversation advertising system may determine that an audience has already purchased a first product that the conversation advertising system was originally trying to persuade the audience to buy, and the conversation advertising system may steer the conversation toward discussing accessories for that product. In some implementations, the conversational advertising system modifies or selects an advertisement script or proceeds through an advertisement script based on a characteristic it identifies pertaining to the audience. For example, the conversational advertising system may perform a gender or age analysis on a voice from the audience and target an advertisement to the audience accordingly. In some implementations, the conversational advertising system resumes a dialog from a previous engagement with an audience. For example, the conversational advertising system may determine that an audience only interacted with an advertisement through a portion of an advertisement script associated with the advertisement. The conversational advertising system may resume the advertisement by picking up from where it left off and/or by recapping the previous interaction between the audience and the conversational advertisement system and proceeding according to an audience's input.

The conversational advertising system listens to an audience by converting speech recorded from the audience into text and analyzing the text. By comparing the text to an advertisement script, and, in some implementations, using text analytics and natural language analysis techniques, the conversational advertising system determines an appropriate response to convey to the audience or an action that should be taken. If it is to respond, the conversational advertising system synthesizes speech using text from or based on the advertisement script. The conversational advertising system may also identify pre-recorded audio or video clips that are responsive to the audience's input. For example, the conversational advertising system may access a database of recorded celebrity voices, from which it may identify audio segments to play to the audience. In some implementations, advertisers or audience members may select a voice from a group of different voices that the conversational advertising system uses in synthesizing speech. For example, an advertiser may specify that the conversational advertising system synthesize speech that has an Australian accent.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Environments

FIG. 1 and the following discussion provide a brief, general description of a suitable computing environment 100 in which a conversational advertising system can be implemented. Although not required, aspects and implementations of the invention will be described in the general context of computer-executable instructions, such as routines executed by a general-purpose computer or a mobile device, e.g., a personal computer or smartphone. Those skilled in the relevant art will appreciate that the invention can be practiced with other computer system configurations, including Internet appliances, set-top boxes, televisions, hand-held devices, wearable computers, vehicle computer systems, radios, household appliances (especially ones connected to the Internet), gaming consoles, mobile phones, laptops, netbooks, tablets, multiprocessor systems, microprocessor-based systems, minicomputers, mainframe computers, or the like. The invention can be embodied in a special purpose computer or data processor that is specifically programmed, configured, or constructed to perform one or more of the computer-executable instructions explained in detail below. Indeed, the terms "computer" and "computing device," as used generally herein, refer to devices that have a processor and non-transitory memory, like any of the above devices, as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Software may include one or more program modules, which include routines, programs, objects, components, data structures, and so on that perform particular tasks or implement particular abstract data types.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described below may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1, a conversational advertising system operates in or among a computing device, such as mobile devices 105, computer 110, appliance 112, television 113, or server 115. The computing device may be deployed in vehicles or other environments. For example, a vehicle radio may include a computing system that plays conversational advertisements in a similar manner as conventional radio advertisements. The mobile devices 105, computer 110, appliance 112, and television 113 include a network card or another device that enables them to communicate through one or more networks 140, and include a microphone and speakers. The mobile devices 105, computer 110, appliance 112, and television 113 communicate via the network 140 with a server 115. A data storage area 120 contains data pertaining to the conversational advertising system, and software necessary to perform functions of these systems. For example, the data storage area 120 may contain data pertaining to advertisements, text-to-speech systems, speech recognition systems, and the like. The conversational advertising system may communicate with one or more third party servers 125, which are coupled to data storage areas 130. Third party servers 125 and server 115 may share advertising data, user data, and the like. The conversational advertising system may store in the data storage area 120 user data and data extracted as a result of an audience's interaction with an advertisement.

The mobile devices 105, computer 110, appliances 112, and television 113 communicate with each other and the server 115 and third party server 125 through the networks 140, including, for example, the Internet. The mobile device 105 communicates wirelessly with a base station or access point 108 using a wireless mobile telephone standard, such as the Global System for Mobile Communications (GSM, or later variants such as 3G or 4G), or another wireless standard, such as IEEE 802.11, and the base station or access point 108 communicates with the server 115 and third party server 125 via the networks 140. The computer 110, appliance 112, and television 113 communicate through the networks 140 using, for example, TCP/IP protocols.

Conversational Advertising Systems

Figure 2:
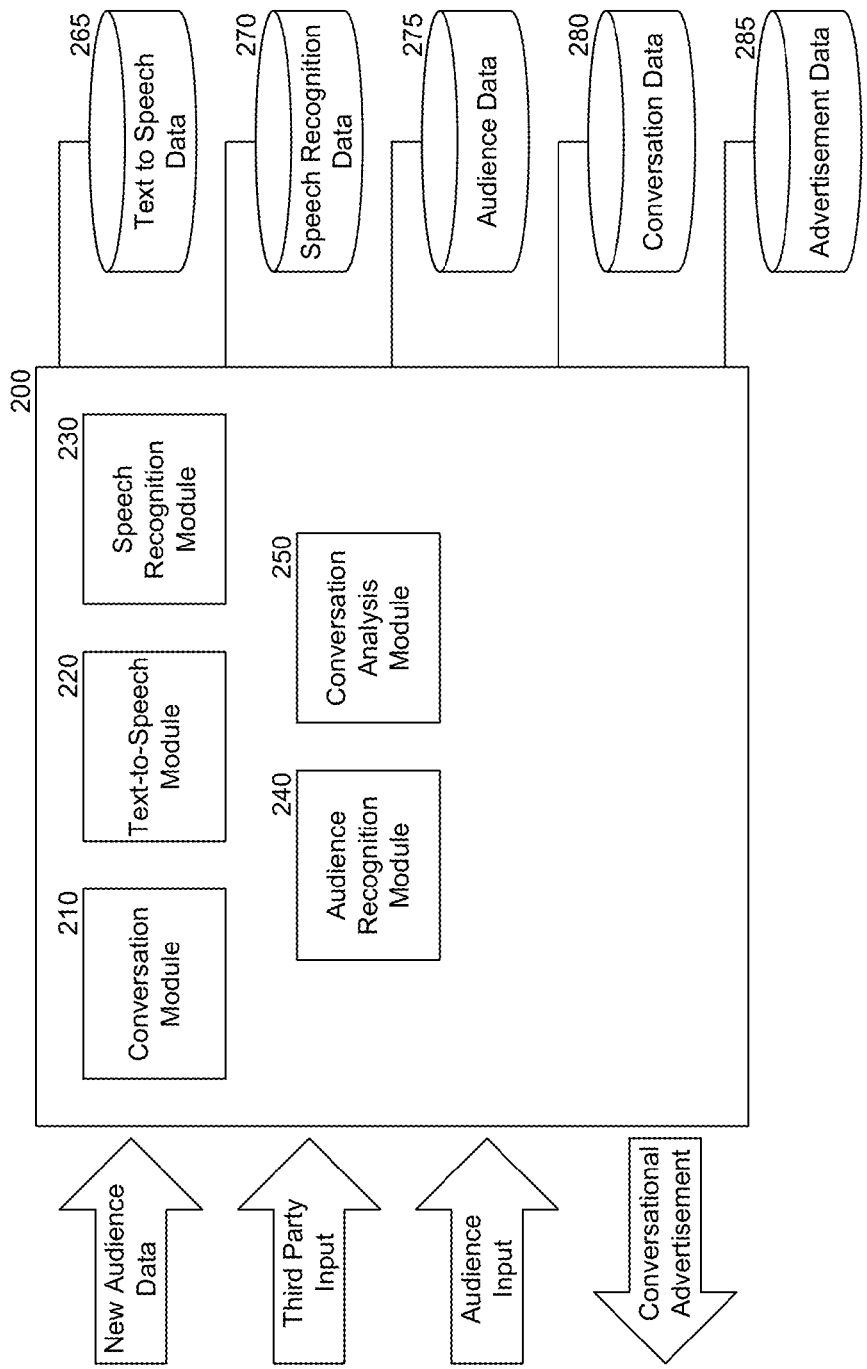
FIG. 2 is a block diagram of the conversational advertising system.

FIG. 2 is a block diagram of various modules of a conversational advertising system 200. The conversational advertising system 200 generates and controls advertisements that engage an audience in a conversation. The conversational advertising system may operate on a server computer, like the server 125, or another device, like the mobile devices 105, computer 110, appliance 112, or television 113, or it may be distributed among one or more devices and a server or among multiple devices in a peer-to-peer arrangement. The conversational advertising system 200 includes a conversation module 210, a text-to-speech module 220, a speech recognition module 230, an audience recognition module 240, and a conversation analysis module 250. The conversational advertising system 200 accesses and stores data in text-to-speech data storage area 265, speech recognition data storage area 270, user data storage area or audience data 275, conversation data storage area 280, and advertisement data storage area 285. Each of these components is discussed in further detail below.

The conversational advertising system 200 receives new audience data, third party input, and audience input, and outputs conversational advertisements. The new audience data includes information pertaining to the audience that the conversational advertising system engages with using a conversational advertisement. The third party input includes input from advertisers, such as advertisements (e.g., an advertisement script, videos, graphics, images, etc.), advertisement metadata (e.g., a description of the advertisement), and data associated with the advertisements (e.g., target audience data). The third party input also includes requests from systems to commence a conversational advertisement. For example, a webpage may send a request to the conversational advertising system to commence the presentation of a conversational advertisement. The audience input includes information submitted by an audience in response to a conversational advertisement. Audience input may include audio data, text, data pertaining to a selection of a feature of an advertisement, and so forth. The conversational advertising system 200 outputs conversational advertisements, including responses from the conversational advertising system to the audience and information related to actions that should be taken as a result of responses from the audience.

Advertisers may use a wizard or another tool to create a conversational advertisement. In some implementations, a wizard guides an advertiser through a series of questions or requests for information, through which the advertiser submits data and information necessary to create a conversational advertisement and corresponding advertisement script. The wizard then compiles the information submitted by the advertiser to create the conversational advertisement. The wizard may provide an interface that allows an advertiser to submit information. The advertiser may specify whether a conversational advertisement is to include audio only or audio and video. The advertiser may also submit basic audience prompts and responses that are to be included in an advertisement script. The advertiser may also select a voice from a group of voices that is to be used to synthesize speech for the conversational advertisement. The advertiser can upload visual elements and dialogue script through the wizard, and identify actions that are to be taken based on a conversation with an audience. Example actions include launching an application, finding an application, launching a webpage, buying a product, and commencing a phone call. In some implementations, an audience is associated with an online wallet or a stored credit card, and an action is to automatically purchase a product based on an audience's response using the online wallet or credit card. In some implementations, a non-advertising user may utilize a wizard or another tool to create a conversational advertisement that is to be conveyed to an audience. For example, a husband may use a wizard to create a conversational advertisement in the form of a birthday card that the husband may send to his wife through e-mail. The birthday card may include a greeting, such as, "Dear Kelli, will you be my Valentine?" The birthday card may include an advertisement script that is to be followed to facilitate a conversational advertisement with the wife.

The conversation module 210 determines whether to provide a conversational advertisement to an audience and, if a conversational advertisement is to be provided, selects an advertisement based on a given audience input (speech, text from speech, etc.), environmental factors, or other information, or it may select to provide a default advertisement. It also analyzes audience responses to the advertisement and determines appropriate responses to convey to the audience in reply to audience responses, or actions that should be taken in light of audience responses.

The conversation module 210 considers a number of factors in determining whether to present a conversational advertisement to an audience. In some implementations, the conversation module makes this determination based at least in part on an analysis of received new user data. Received new user data includes information pertaining to an environment in which the conversational advertisement is to be presented. For example, new user data may include global positioning system (GPS) coordinates provided by a device that is to present a conversational advertisement. New user data may also include information pertaining to background noise levels of the device and an audience's current status with the device. For example, a mobile device can provide information pertaining to an audience's status within a game that the audience is playing or a web page that the audience is viewing. In some implementations, the conversation module determines to provide a conversational advertisement if the environmental factors meet a particular standard. For example, the conversation module may provide a conversational advertisement if noise measured by the device is below a certain amplitude, if the device is within a particular geographic area, if the audience is determined to be viewing a particular video, or so forth. In some implementations, the conversation module determines to proceed with presenting a conversational advertisement regardless of a status of an audience or any other information determined about the audience.

The conversation module 210 selects an advertisement to provide to the audience from a repository of advertisements in advertisement data storage area 285. In some implementations, the conversation module identifies an advertisement that is likely to be relevant to the audience. It may base this selection on information associated with the audience that it receives from the audience recognition module 250 or speech recognition module 230. It may also base this selection on received audience input. For example, the conversation module may receive information related to a search query submitted by the audience and identify an advertisement associated with the search query.

The conversation module 210 facilitates a conversation with an audience by analyzing audience responses and generating appropriate responses. The conversation module receives text of an audience's response, and data associated therewith, from the speech recognition module 230. And the conversation module provides text of a response to the text-to-speech module 220, which generates speech that is played to the audience. In some implementations, conversation module receives text input submitted by an audience in response to an advertisement. The conversational advertising system can also deliver and present text of a response provided by the conversation module in order to respond to an audience. The text of the response can be the same or different from the words that are synthesized into audio and played to the audience. For example, the conversational advertising system may provide subtitles that are a formal version of the words that are synthesized and played to the audience. In some implementations, the conversational advertising system displays subtitles of the words that are synthesized and played to the audience. For example, the conversational advertising system may synthesize and play English words to the audience and display Spanish subtitles of the words simultaneously. In some implementations, the conversation module identifies in advertisement data storage area 285 pre-recorded audio and/or video segments that are responsive to an audience's input, and the conversational advertising system 200 plays these segments to the audience instead of or in addition to synthesized speech from text. In some implementations, an audience response includes other user input, such as an indication of a selection of a graphical user interface (GUI) object or text that was submitted by the user. The conversation module 210 may receive and analyze this other user input as well.

The conversation module 210 guides a conversation with an audience using an advertisement script. The conversation module compares text of an audience's response to an advertisement script in order to determine appropriate responses to audience responses or actions that should be taken in light of audience responses. In some implementations, appropriate responses and/or actions are determined by searching text of an audience's response for keywords or phrases (and synonyms or otherwise related words or phrases) specified by the advertisement script. Each keyword or phrase may be associated with an appropriate response and/or action. In some implementations, the conversation module 210 applies text analytics or natural language processing techniques to analyze the audience's response and compare it to the advertisement script in order to determine an appropriate response or action. In some implementations, the conversation module navigates an advertisement script based at least in part on information associated with the presentation of a conversational advertisement, including, for example, environmental data pertaining to the presentation of the advertisement. For example, the conversation module may determine that a conversational advertisement is being presented in a noisy environment and it may navigate an advertisement script in order to speak to the audience more than it would have in a quite environment. In some implementations, the conversation module accesses information from audience data storage area 275 pertaining to an audience's previous experience with an advertisement script in order to determine an appropriate place within the script to recommence interaction with the audience. For example, an audience may have navigated away from a conversational advertisement appearing on a first web page, and the conversational advertising system may continue the conversational advertisement on a second web page, picking up from where the audience left off in the audience's initial interaction with the advertisement.

The conversation module 210 may supplement or otherwise modify a response or action of a script. In some implementations, the conversation module personalizes a response or action based on information about the audience. For example, it may modify a response so that it includes a name of an audience member or a city that the audience member lives, which it may determined based on audience input or data from the audience recognition module. As another example, the conversation module may receive data from the speech recognition module 230 pertaining to a suspected gender or age of an audience member, identified through gender or age analysis techniques applied to an audience response. As another example, the conversation module 210 may modify an action associated with launching a website so that the audience's Internet browser is directed to a webpage designed for the audience's location. In some implementations, the conversation module selects a response to convey to the audience that is likely to be relevant to the audience, basing its selection on information associated with the audience. For example, if an audience's response is associated with two different reply options in an advertisement script, one pertaining to women and one pertaining to men, the conversation module may select the response pertaining to women if the audience recipient is determined to include a woman.

The conversation module 210 may pre-process advertisements and advertisement scripts. Third party data received by the conversational advertising system may include advertisements or portions of advertisements. The conversation module 210 may process the submitted information to automatically identify relevant keywords or other data in order to provide an intelligent conversation with the audience. In some implementations, an administrator reviews information submitted by an advertiser in order to identify keywords or other information to be used by the conversation module to interpret an audience's response to an advertisement, or to select an appropriate response or action based on the audience's response. For example, an advertiser may submit a script to the conversational advertising system that an administrator of the conversational advertising system manually reviews to identify relevant keywords and responses. The conversation module 210 stores advertisements and associated data in the advertisement data storage area 285.

If the conversation module 210 determines that an action should be taken in light of a response from the audience, the conversation module transmits instructions to appropriate hardware and/or software modules or computing devices so that the action may be executed. For example, a conversational advertising system operating on a server and presenting a conversational advertisement on a mobile device may instruct the mobile device to launch a web browser in order to execute an action of directing the audience to a particular webpage. In some implementations, the conversational advertising system utilizes application programming interfaces (APIs) existing on the operating system of a client device (e.g., an audience's mobile device) and functionality embodied in the operating system and other applications of the client device to automatically perform actions based on an audience's verbal input to the conversational advertising system. As discussed above, a single conversational advertisement includes multiple destinations (e.g., actions that may be taken based on how a conversation unfolds), and the audience may determine the ultimate destination based on how the audience engages with the conversational advertisement.

The text-to-speech module 220 receives text and converts it into speech. The text-to-speech module may also receive input pertaining to a speech preferences. For example, an advertiser may specify that synthesized speech have a particular voice. In some implementations, the text-to-speech module chooses a voice for synthesized speech based at least in part on information associated with the audience. For example, if the audience is determined to be British, the text-to-speech module may synthesize speech that has a British accent. As mentioned above, the text-to-speech module 220 may receive text to convert to speech from the conversation module 210. For example, the text may be a response of the conversational advertising system to an audience. The text-to-speech module 220 utilizes a speech synthesizer. One suitable speech synthesizer is sold by Nuance Communications, Inc. of Burlington, Mass., and called Vocalizer. The text-to-speech module 220 accesses data stored in the text-to-speech data storage area 265, which it uses to convert text to speech.

The speech recognition module 230 receives audio data and generates a transcription of spoken words represented by the audio data. The audience input that is received by the conversational advertising system may include audio data representing words spoken by the audience and captured by a microphone. The speech recognition module 230 utilizes a speech recognition application, such as Dragon, which is also sold by Nuance Communications, Inc. The speech recognition module 230 accesses data stored in the speech recognition data storage area 270, which it uses to identify spoken words from audio recordings. The speech recognition module 230 also analyzes received audio data to identify information pertaining to the audience. For example, the speech recognition module can utilize gender or age analysis techniques in order to identify a sex or age of a member of an audience.

The audience recognition module 240 identifies information associated with an audience. The information associated with the audience may be used by the conversation module 210 for targeting conversational advertisements to the audience. The audience recognition module 240 may identify this information in the new audience data that is received by the conversation advertising system. The new audience data may include identifying information associated with the audience, such as an IP address, a username, an account number, environmental information (e.g., a location of the audience, noise information pertaining to the audience's environment, computer usage information), and so forth. The audience recognition module 240 may search for stored audience data that is associated with the new audience data. The audience data storage area 275 may contain the stored audience data. Stored audience data may include, for example, interests or data related to advertisements that the audience previously viewed, such as the audience's response to previously presented conversational advertisements. The conversational advertising system 200 is configured to identify advertisements and responses that are likely to be relevant to the audience based on the information known about the audience. When new audience data is received, the audience recognition module 240 stores the new audience data in audience data storage area 275. The audience data storage area 275 may also store other data relevant to advertising, such as demographic data, survey responses, Internet cookies and ad logs that track individual audience member's interactions with online content, etc.

The conversation analysis module 250 examines conversations that result from a conversational advertisement to learn information associated with the audience and the advertisement. For example, the conversation analysis module 250 may determine an interest of an audience based on the audience's response to a question. In some implementations, the conversation analysis module 250 parses an audience's responses to an advertisement to identify information that may be relevant to the user. For example, the conversation analysis module may identify products or services mentioned by the audience in responses. The conversation analysis module 250 may also determine whether a conversational advertisement successfully engaged an audience. In some implementations, it bases this determination on the number of responses that an advertisement elicits from the audience. The conversation analysis module 250 stores data related to the audience in an audience data storage area 275 and data related to an advertisement or conversation in the conversation data storage area 280.

Suitable Processes

Figure 3:
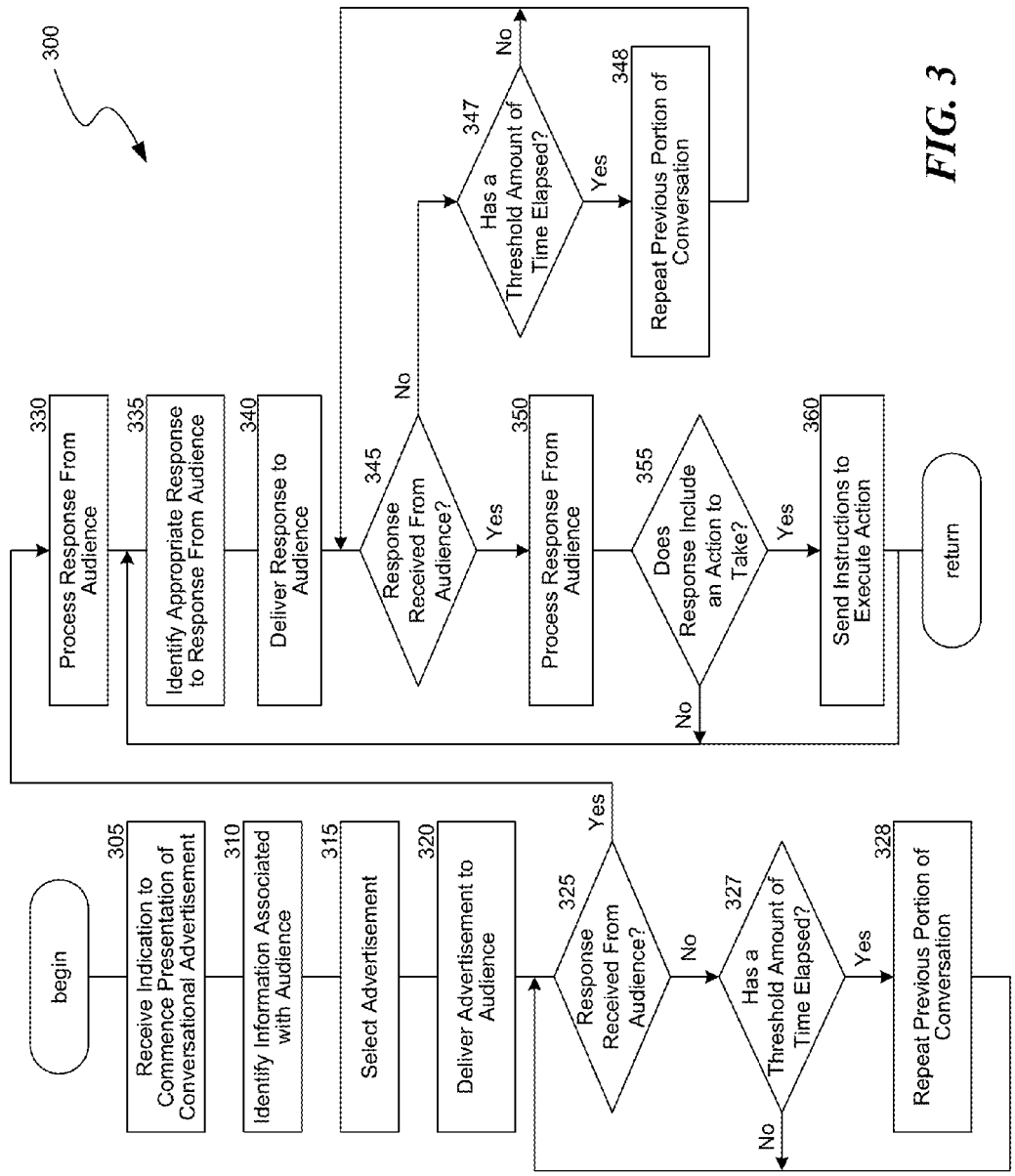
FIG. 3 is a flow diagram depicting a method performed by the conversational advertising system to engage an audience in a conversational advertisement.

One application for the conversational advertising system 200 is for advertising to an audience through a verbal conversation with the audience. FIG. 3 is a flow diagram of a process 300 implemented by the conversational advertising system 200 for engaging an audience in a conversational advertisement. At a block 305, the conversational advertising system 200 receives an indication to commence the presentation of a conversational advertisement to an audience.

The indication to commence the presentation of the conversational advertisement may be received from a web page, an application, the audience, or the like. For example, an Internet radio application may have a commercial break and may send a request to the conversational advertising system for a conversational advertisement to be conveyed to an audience during the break. In some implementations, a computing device that presents the conversational advertisement may include an agent. The agent may be part of a conversational advertising system on the device or it may exist as a separate plug-in or add-on to the device. In some implementations, the agent is an application. The agent may be run as a silent process on the computing device or it may be noticeable to the audience. The agent receives input and may automatically generate an indication to commence a presentation of a conversational advertisement. The input received by the agent may include data existing on the computing device. For example, the agent may search calendar entries stored on the computing device and generate an indication to commence a presentation of a conversational advertisement if it identifies a calendar entry that is related to a conversational advertisement stored in a database of conversational advertisements. In some implementations, the agent parses a user's input to the device generates an indication to commence the presentation of a conversational advertisement based on the user's input. For example, the agent may generate the indication to commence the presentation of a conversational advertisement if it identifies that a text message drafted by a user includes content that is related to the advertisement.

At a block 310, the conversational advertising system identifies information associated with the audience. The audience may be associated with an identifier, such as an IP address, cookie (or similar identifier), username, account number, or the like. The identifier may be anonymized using known means to obscure any personally identifiable information associated with individual audience members. The conversational advertising system may gather information related to the audience's previous use of the conversational advertising system, such as responses received from the audience pertaining to previously presented conversational advertisements, and it may identify this information based on an association between this information and the identifier associated with the audience. The conversational advertising system may also gather other data associated with the audience, such as data related to purchases made by an audience member, a search query submitted by an audience member, an Internet browsing history of an audience member, social networking profiles of audience members, email messages sent and received by audience members, and the like. In some implementations, the conversational advertising system does not identify information associated with the audience.

At a block 315, the conversational advertising system selects a conversational advertisement to deliver to the audience. The conversational advertising system may select an advertisement from a repository of conversational advertisements. In some implementations, the conversational advertising system selects an advertisement based at least in part on which advertisement is likely to be relevant to the audience. The conversational advertising system may compare information associated with the audience to metadata associated with the advertisement to determine whether an advertisement is likely to be relevant to the audience. For example, information associated with the audience may indicate that an audience member recently purchased rock-climbing equipment. Metadata associated with an advertisement may indicate that the advertisement pertains to adventuresome or extreme sports. Accordingly, the conversational advertising system may select the advertisement pertaining to extreme sports because it is likely relevant to the audience member who recently purchased rock-climbing equipment.

At a block 320, the conversational advertising system delivers the selected conversational advertisement so that it may be presented to the audience. The conversational advertising system may deliver the advertisement to the system, device, application, or the like, that requested that a conversational advertisement be commenced. For example, a web browser of a mobile device may display a webpage that includes an embedded conversational advertisement. The conversational advertising system may transfer data pertaining to a conversational advertisement to the web browser. This data may include, for example, audio data that is played to the audience as part of the advertisement. In some implementations, a conversational advertisement is presented concurrently with other content. For example, a game being played on a mobile device may present a conversational advertisement during gameplay. In other implementations, an application or another process or other content is paused or terminated in order to present a conversational advertisement.

The conversational advertisement may be associated with a script. The conversational advertising system follows the script in order to engage the audience in a conversation. FIG. 4A is a representative script 400 that may be associated with a conversational advertisement. The script includes a first question 405 that is automatically asked to the audience upon commencement of the conversational advertisement. In some implementations, when the conversational advertising system delivers the selected conversational advertisement at block 320, the conversational advertising system delivers audio data representing synthesized speech of a first line of a script. In other implementations, the conversational advertising system does not deliver a first line and instead invites the audience to commence the conversation. For example, the conversational advertising system may play a graphic that states: "Tell me your name," and wait for a response from the audience.

At a decision block 325, the conversational advertising system determines whether a response to the conversational advertisement has been received. If a response has been received, the process 300 proceeds to a block 330, and the conversational advertising system processes the response. If the response has not been received, the process 300 proceeds to a decision block 327, and the conversational advertising system determines whether a threshold amount of time has elapsed since the audience was presented with the conversational advertisement. If the threshold amount of time has not elapsed since the audience was presented with the conversational advertisement, the process 300 returns to decision block 325. If the threshold amount of time has elapsed, the process 300 proceeds to a block 328, and the conversational advertising system repeats a portion of the conversation. For example, referring to FIG. 4A, if the conversational advertising system had delivered audio data representing synthesized speech of the first question 405, the conversational advertising system may repeat the first question 405. After repeating the portion of the conversation, the process returns to block 325.

At block 330, the conversational advertising system processes the audience's response. In some implementations, the conversational advertising system converts audio data representing an audience's response to a text string, and compares the text string (and associated synonyms of words from the text string) to a list of expected keywords (and synonyms thereof). For example, the script 400 identifies three keywords 410a-c that it expects to receive from an audience in response to the first question 405. The script 400 also includes a [not recognized] keyword placeholder 410d for when the conversational advertising system does not recognize any expected keyword in the response from the audience. In some implementations, processing an audience's response includes applying text analytics and/or natural language processing or other text analysis strategies to the response.

At a block 335, the conversational advertising system identifies an appropriate response to the audience's response. The conversational advertising system may identify an appropriate response by following the script associated with the conversational advertisement. For example, the script 400 includes first responses 415a-d that are associated with the first keywords 410a-d, respectively. If an audience's response included the first keyword 410a, "Yes," which is associated with the first response 415a, the conversational advertising system identifies the first response 415a as the appropriate response to the audience's response. In some implementations, an appropriate response is chosen based at least in part on information pertaining to the audience. For example, the response 415b may be associated with the first keyword 410b, "Sporting goods," and any response not equivalent to "Home furnishings" if the audience is determined to be fewer than 23 years old.

At a block 340, the conversational advertising system delivers to the audience the response to the audience's response. The conversational advertising system may deliver audio data that includes synthesized speech representing the response to the audience's response. For example, returning again to FIG. 4A, the conversational advertising system may synthesize speech representing the first response 415a, and it may deliver audio data of the synthesized speech to be played to the audience. In some implementations, the conversational advertising system modifies a response before delivering it to the audience. For example, information may be added to a response that is identified based on information about the audience. In FIG. 4A, response 416 includes a bracketed phrase stating "Don't forget to sign up for the local 3-on-3 tournament happening this summer." This phrase is added to the response after the conversational advertising system identifies the hometown of the audience.

The conversational advertising system may follow the advertisement script to converse with the audience back-and-forth many times. Hence, the process 300 proceeds to a block 345, and the conversational advertising system determines whether a response was received from the audience. This step in the process involves a similar process as that which was described above with respect to block 325.

Additionally, at blocks 347, 348, and 350, the process is similar to the process described above with respect to blocks 327, 328, and 330, respectively. However, at block 345, the conversational advertising system may be deeper in the advertisement script. For example, referring again to FIG. 4A, in response to the first response 415a, the conversational advertising system anticipates second keywords 418a-d. Accordingly, the description above pertaining to blocks 325, 327, and 238 is applicable as well to blocks 345, 347, 348, and 350.

At a decision block 355, the conversational advertising system determines whether an action should be taken in light of the audience's response. If the audience's response does not elicit an action, the process returns to block 335, and the conversational advertising system identifies an appropriate response to the response from the audience. If the audience's response does include an action to take, the process proceeds to a block 360, and the conversational advertising system transfers instructions to the appropriate software or hardware module to execute the action. For example, referring to FIG. 4A, if in response to a third response 420a, the audience's response includes an action keyword 425a, "Online," the conversational advertising system outputs instructions for executing the action, which includes opening a web browser and connecting to an online store. Finally, the process 300 returns.

A conversational advertisement may include a graphical interface that is presented to an audience. FIGS. 5A-B are representative interfaces that are displayed by a mobile device and depict the presentation of a conversational advertisement to an audience. FIG. 5A shows an interface 500 that includes an advertising graphic 505 and a first line 510 of a conversational advertisement. The mobile device plays audio of the first line 510, which is audible to the audience of the conversational advertisement. The advertising graphic 505 is associated with the conversational advertisement and provides an indication to the audience that a conversational advertisement has commenced. In some implementations, a conversational advertisement includes graphical elements, such as the advertising graphic 505 and the first line 510. In some implementations, a conversational advertisement does not include any graphical elements.

FIG. 5B shows the interface 500 after multiple responses between the conversational advertising system and the audience. The interface 500 includes a first audience response 515, a first conversational advertising system response 520, a second audience response 525, and a second conversational advertising system response 530. As discussed throughout, the audience and the conversational advertising system communicate these responses verbally as if they were engaged in a conversation. After the second conversation advertising system response 530, the conversational advertising system may take an action of commencing a phone conversation with between a taxi company and the audience.

Figure 6:
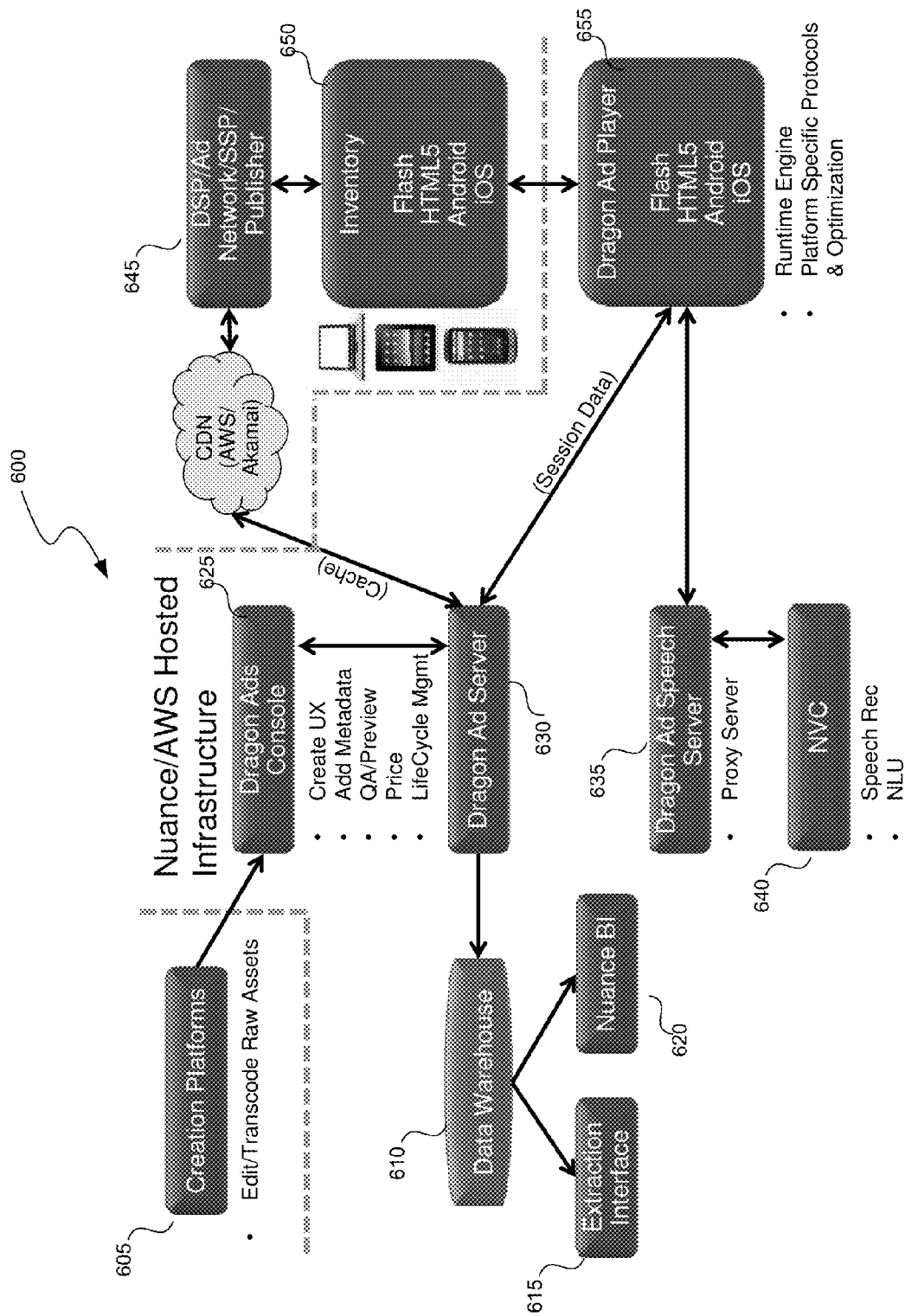
FIG. 6 is a block diagram of various components of a system for providing conversational advertisements.

FIG. 6 shows a block diagram of components of a system 600 for creating, delivering, and presenting conversational advertisements. FIG. 6 is self-explanatory based on the above detailed description. However, to provide reinforcement of the disclosure of the various features of the figures, the following description is provided. FIG. 6 includes several features and components based on products and services sold and supported by Nuance Communications, Inc. of Burlington, Mass. FIG. 6 includes creation platforms component 605, a data warehouse component 610, an extraction interface component 615, a Nuance business intelligence (BI) component 620, a Dragon ads console component 625, a Dragon ad server component 630, a Dragon ad speech server component 635, a Nuance Voice Control (NVC) component 640, a DSP/Ad Network/SSP/Publisher component 645, an inventory component 650, and a dragon ad player component 655. The creation platforms component 605 provides, among other things, means to edit and transcode raw assets. Some products and services capable of providing the means to edit and transcode raw assets include those sold by Celtra Inc., Adobe Systems Inc., GoldSpot Media Inc., and Flite Inc. The extraction interface component 615 may be implemented to include products or services sold by, for example, Cognos, Inc., Oracle Corporation, or Microsoft Corporation (e.g., Microsoft SQL Server). The Nuance BI component 620 may be implemented to include products or services sold by, for example, Pentaho Corporation. The DSP/Ad Network/SSP/Publisher component 645 may be implemented to include products or services sold by, for example, Millenial Media, Inc., DataXu, Inc., and AdMarvel, Inc.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, and the assignee's U.S. patent application Ser. No. 12/601,004, filed Jun. 14, 2010, and Ser. No. 12/565,916, filed Sep. 24, 2009, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A system for engaging an audience in a conversational advertisement, wherein the system includes a processor and a memory, the system comprising:
   a conversation module implemented by the processor and configured to:
      receive an indication to present a conversational advertisement to multiple members of an audience;
      identify a conversational advertisement to present to the multiple members of the audience;
      convey a first message of the conversational advertisement to the multiple members of the audience,
         wherein the first message is conveyed contemporaneously to the multiple members using a single communication session;
      process spoken words from audio data representing a verbal response to the first message from a first member of the multiple members of the audience,
         wherein the verbal response to the first message is one of multiple individual responses provided by two or more of the multiple members of the audience; and
      determine a response to convey to the first member of the audience,
         wherein the response to convey to the first member of the audience is determined based at least in part on the spoken words from the audio data representing the verbal response to the first message from the first member of the audience; and
   a speech recognition module implemented by the processor and configured to:
      receive audio data representing the verbal response of the first member of the audience to the first message of the conversational advertisement; and
      identify spoken words from the audio data representing the verbal response to the first message from the first member of the audience.

2. The system of claim 1:
   wherein the conversational advertisement includes an advertisement script, wherein the advertisement script includes multiple possible responses based on different received verbal responses; and
   wherein the conversation module is further configured to:
      compare (A) the spoken words from the audio data representing the verbal response to the first message to (B) at least a portion of the advertisement script, and
      identify, based on the comparison, a script response that is included in the advertisement script as the response to convey to the member of the audience.

3. The system of claim 1,
   wherein the response to convey to the first member of the audience is based on identified information associated with the first member of the audience;
   wherein the information associated with the first member of the audience includes gender information determined by analyzing the audio data representing the verbal response to the first message.

4. The system of claim 1, wherein the conversation module is further configured to identify a conversational advertisement to present to the multiple members of the audience based at least in part on information associated with one or more of the multiple members of the audience.

5. The system of claim 1, wherein the conversational advertisement includes an advertisement script that includes at least one of:
   a non-connected path configured to be used to navigate the advertisement script when the audio data representing the verbal response to the first message from the first member of the audience cannot be received,
   a nonsense path configured to be used to navigate the advertisement script when the audio data representing the verbal response to the first message from the first member of the audience is nonsensical, a default path configured to be used to navigate the advertisement script when, despite being able to receive audio data, no audio data representing the verbal response to the first message from the first member of the audience is received, or any combination thereof.

6. The system of claim 1, wherein the conversation module is further configured to determine an action that is to be taken based at least in part on the spoken words from the audio data representing the verbal response to the first message from the first member of the audience.

7. The system of claim 1,
wherein the conversational advertisement is presented to the member of the audience through one or more web browsers;
wherein the first message of the conversational advertisement is presented on a first webpage; and
wherein the response to convey to the member of the audience is presented on a second webpage different from the first webpage such that the response to convey to the member of the audience continues the conversational advertisement on the second webpage, picking up from where the member of the audience left off with initial interactions with the conversational advertisement presented on the first webpage.

8. The system of claim 1,
wherein the response to convey to the first member of the audience is further based on a conversation observed between the multiple members of the audience.

9. A method of engaging an audience in a conversational advertisement, wherein the method is performed by a computing system having a processor and a memory, the method comprising:
identifying, at a server computer, a conversational advertisement to present to an audience via a client device in response to a received indication to present an advertisement,
wherein the conversational advertisement is selected from multiple conversational advertisements and
wherein the identified conversational advertisement provides a verbal interface such that the identified conversational advertisement provides responses, to verbal input provided to the verbal interface, that are based on an identified meaning of the verbal input to the verbal interface;
orchestrating, through a first webpage, at least two initial interactions between the audience and the conversational advertisement, wherein one of the at least two initial interactions comprises:
conveying, at the server computer, a first message of the conversational advertisement to the client device to be presented to the audience; and
receiving, at the server computer, audio data from the client device representing a verbal response by the audience to the first message of the conversational advertisement,
wherein the audio data is received through the member of the audience interacting with the first webpage;
identifying, at the server computer, based on the spoken words from the audio data representing the verbal response of the audience to the first message, a particular point in a conversation with the member of the audience; and
processing, at the server computer, the spoken words from the audio data representing the verbal response of the audience to the first message;

determining, at the server computer, a response to convey to the audience via the client device,
wherein the response to convey to the audience is determined based at least in part on the spoken words from the audio data representing the verbal response by the audience to the first message, and
converting, at the server computer, the response to convey to the audience to response audio data to be played to the audience;
wherein the response to convey to the member of the audience is presented on a second webpage different from the first webpage such that the response to convey to the member of the audience continues the conversational advertisement on the second webpage, picking up from the identified particular point in the conversation with the member of the audience such that the conversation with the member of the audience continues where the member of the audience left off from the at least two initial interactions with the conversational advertisement orchestrated through the first webpage.

10. The method of claim 9,
wherein the conversational advertisement includes an advertisement script,
wherein processing, at the server computer, the spoken words from the audio data representing the verbal response by the audience to the first message includes comparing, at the server computer, the spoken words from the audio data representing the verbal response by the audience to the first message to at least a portion of the advertisement script, and
wherein determining, at the server computer, the response to convey to the audience includes identifying, at the server computer, a script response that is included in the advertisement script.

11. The method of claim 10, wherein the received indication to present the advertisement is received, at the server computer, from an agent operating on the client device.

12. The method of claim 9, wherein identifying, at the server computer, a conversational advertisement to present to the audience includes identifying, at the server computer, a conversational advertisement associated with an input of the audience on the client device.

13. The method of claim 9, wherein:
determining, at the server computer, the response to convey to the audience is based at least in part on a previous response of the audience to one or more conversational advertisements, and
conveying, at the server computer, the first message of the conversational advertisement to the client device to be presented to the audience includes conveying, at the server computer, instructions to present the first message in both audio and textual forms on the client device.

14. The method of claim 9, further comprising determining, at the server computer, an action that is to be taken by the client device, wherein the action is determined based at least in part on the spoken words from the audio data representing the verbal response of the audience to the first message.

15. The method of claim 9, wherein the response to convey to the member of the audience is customized by incorporating details from a calendar entry into the response to convey to the member of the audience.

16. A non-transitory computer-readable medium whose contents, when executed by a computing system having a processor and a memory, cause the processor to perform a method of engaging an audience in a conversational advertisement, the method comprising:
identifying, at a server computer, a conversational advertisement to present to an audience via a client device in response to a received indication to present an advertisement,
wherein the conversational advertisement is selected from multiple conversational advertisements and
wherein the identified conversational advertisement provides a verbal interface such that the identified conversational advertisement provides response, to verbal input provided to the verbal interface, that are based on an identified meaning of the verbal input to the verbal interface;
orchestrating, through a first webpage, at least two initial interactions between the audience and the conversational advertisement, wherein one of the at least two initial interactions comprises:
conveying, at the server computer, a first message of the conversational advertisement to the client device to be presented to the audience; and
receiving, at the server computer, audio data from the client device representing a verbal response by the audience to the first message of the conversational advertisement,
wherein the audio data is received through the member of the audience interacting with the first webpage;
identifying, at the server computer, based on the spoken words from the audio data representing the verbal response of the audience to the first message, a particular point in a conversation with the member of the audience; and
processing, at the server computer, the spoken words from the audio data representing the verbal response of the audience to the first message;
determining, at the server computer, a response to convey to the audience via the client device,
wherein the response to convey to the audience is determined based at least in part on the spoken words from the audio data representing the verbal response by the audience to the first message, and
converting, at the server computer, the response to convey to the audience to response audio data to be played to the audience;
wherein the response to convey to the member of the audience is presented on a second webpage different from the first webpage such that the response to convey to the member of the audience continues the conversational advertisement on the second webpage, picking up from the identified particular point in the conversation with the member of the audience such that the conversation with the member of the audience continues where the member of the audience left off from the at least two initial interaction with the conversational advertisement orchestrated through the first webpage.

17. The non-transitory computer-readable medium of claim 16, wherein the conversational advertisement includes an advertisement script,
wherein processing, at the server computer, the spoken words from the audio data representing the verbal response by the audience to the first message includes comparing, at the server computer, the spoken words from the audio data representing the verbal response by the audience to the first message to at least a portion of the advertisement script, and
wherein determining, at the server computer, the response to convey to the audience includes identifying, at the server computer, a script response that is included in the advertisement script.

18. The non-transitory computer-readable medium of claim 17, wherein the received indication to present the advertisement is received, at the server computer, from an agent operating on the client device.

19. The non-transitory computer-readable medium of claim 16, wherein identifying, at the server computer, a conversational advertisement to present to the audience includes identifying, at the server computer, a conversational advertisement associated with an input of the audience on the client device.

20. The non-transitory computer-readable medium of claim 16, wherein:
determining, at the server computer, the response to convey to the audience is based at least in part on a previous response of the audience to one or more conversational advertisements, and
conveying, at the server computer, the first message of the conversational advertisement to the client device to be presented to the audience includes conveying, at the server computer, instructions to present the first message in both audio and textual forms on the client device.

21. The non-transitory computer-readable medium of claim 16, further comprising determining, at the server computer, an action that is to be taken by the client device, wherein the action is determined based at least in part on the spoken words from the audio data representing the verbal response of the audience to the first message.

22. The non-transitory computer-readable medium of claim 16,
wherein the response to convey to the member of the audience is customized by incorporating details from a calendar entry into the response to convey to the member of the audience.

* * * * *